United States Patent [19]

Datta

[11] Patent Number: 4,512,916
[45] Date of Patent: Apr. 23, 1985

[54] VIDEO DISC MOLDING COMPOSITION
[75] Inventor: Pabitra Datta, Cranbury, N.J.
[73] Assignee: RCA Corporation, Princeton, N.J.
[21] Appl. No.: 452,915
[22] Filed: Dec. 27, 1982
[51] Int. Cl.³ .............................................. H01B 1/06
[52] U.S. Cl. ..................................... 252/511; 524/495;
524/496; 369/286; 369/276; 369/126; 346/137
[58] Field of Search ............... 252/511, 49.6; 523/174;
524/495, 496, 261; 358/244.2, 244; 369/126,
276, 286; 428/64, 65, 447, 451

[56] References Cited

U.S. PATENT DOCUMENTS

| | | | |
|---|---|---|---|
| 4,228,050 | 10/1980 | Martin et al. | 358/128 |
| 4,275,100 | 6/1981 | Datta | 369/286 |
| 4,275,101 | 6/1981 | Wang et al. | 369/286 |
| 4,280,941 | 7/1981 | Datta et al. | 252/511 |
| 4,330,583 | 5/1982 | Datta et al. | 428/65 |
| 4,351,747 | 9/1982 | Mujamoto et al. | 252/511 |
| 4,355,062 | 10/1982 | Wang et al. | 428/64 |
| 4,378,310 | 3/1983 | Datta et al. | 252/511 |
| 4,384,055 | 5/1983 | Okudu et al. | 524/496 |

FOREIGN PATENT DOCUMENTS 2108970  5/1983  United Kingdom .

Primary Examiner—Josephine L. Barr
Attorney, Agent, or Firm—Birgit E. Morris; Howard F. VanDenburgh

[57] ABSTRACT

A conductive molding composition for the compression molding of high density information discs (video discs). The composition includes a polyvinylchloride-based resin containing sufficient carbon black particles to obtain a desired conductivity (bulk resistivity of about 500 ohm-cm at 900 mHz or less,) from about 1 to 5 weight percent of a stabilizer, from about 0.5 to 3 weight percent of a lubricant, from about 1 to 5 weight percent of a plasticizer and from about 0.1 to 1 weight percent of an organo-silicone compound having polar groups.

22 Claims, 1 Drawing Figure

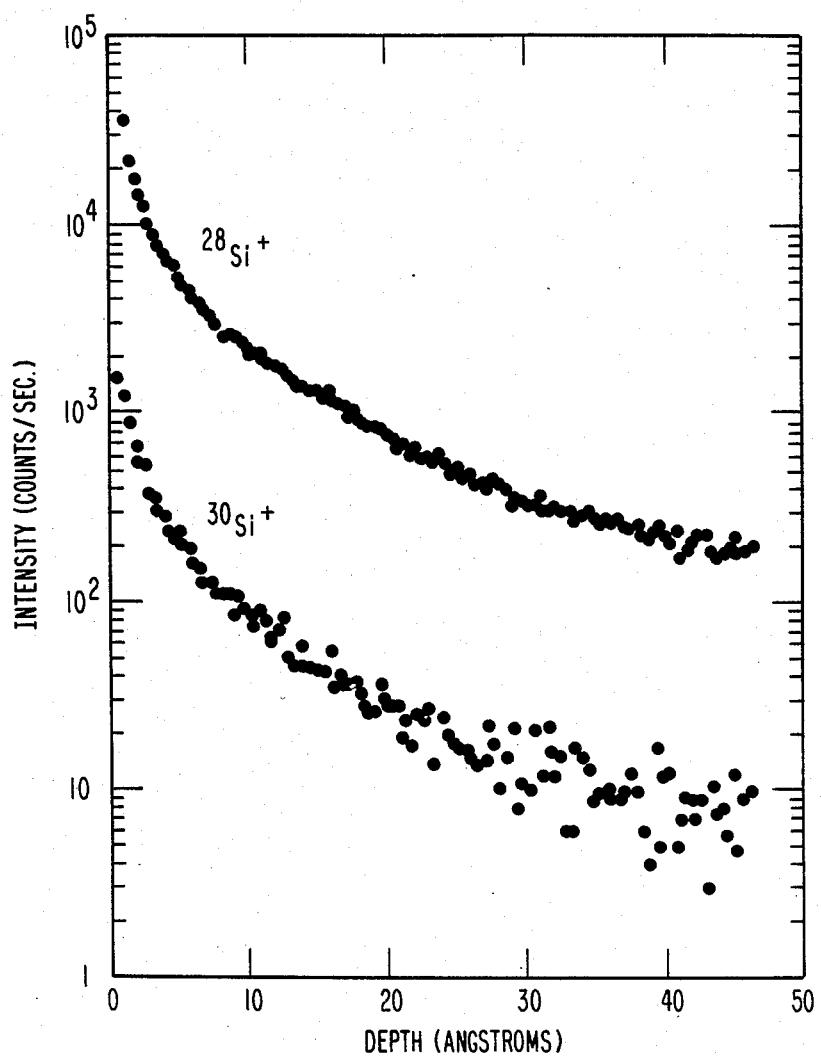

VIDEO DISC MOLDING COMPOSITION

This invention relates to the manufacture of high density information discs, also known as video discs. More particularly, this invention pertains to a molding composition for video discs which maximizes performance properties while at the same time reduces the number of components and simplifies manufacture.

BACKGROUND OF THE INVENTION

Martin et al., in U.S. Pat. No. 4,228,050, have disclosed an improved conductive molding composition for the compression molding of high density information discs, also known as video discs. This composition, in essence, comprises a polyvinylchloride-based resin containing sufficient conductive carbon black particles to provide the requisite conductivity, i.e., a bulk resistivity of below about 500 ohm-cm at 900 mHz. The formulation additionally contains additives such as stabilizers, lubricants, plasticizers, processing aids and the like. The composition disclosed by Martin et al. contains a large number of such additives which are required to stabilize the finished disc. It has been found in developing this formulation that care must be used in selecting each additive because not only its own stability must be taken into account, but one must examine the stability of each additive vis-a-vis the other additives, their degradation products, their potential reactions with each other, as well as with or between each other. Obviously, the more ingredients that are present the more complex the problem becomes and potentially the greater the possibility that reactions will occur, for example, during the heat and pressure encountered in compression molding of the disc.

Even the complex composition disclosed by Martin et al. is inadequate to prevent deterioration of the disc upon exposure to conditions of elevated temperature and relative humidity. This deterioration affects the playback characteristics of the disc so that they are no longer excellent and maybe even progress to where they are unacceptable. In order to offset this deterioration, the discs, after they are pressed, are treated to remove any material on the surface of the disc. For example, they may be washed, with an aqueous cleaning solution containing an oxidizing agent, a base and a fluorosurfactant as disclosed in U.S. Pat. No. 4,275,100 to Datta, and then rinsed with water and dried. In addition to the treating steps, the discs are further coated with a methylalkylsiloxane lubricant which is doped with a diloxane dopant as disclosed in U.S. Pat. No. 4,355,062 to Wang et al. Discs thus washed and lubricated have been found to possess excellent playback characteristics over extended periods of time, even under conditions of high temperature and high relative humidity.

There exists, however, a need to simplify the formulation of the video disc molding composition thereby reducing the number of chemical reactions which can occur during and after manufacture and/or reduce the number of processing steps required for the disc's manufacture for an obvious savings in cost and time. In accordance with this invention, there is provided an improved conductive molding composition for the video disc which significantly reduces the number of ingredients required, eliminates the required further treating or washing operation and the use of doped lubricants, while retaining and even improving the playback performance characteristics of the finished discs.

SUMMARY OF THE INVENTION

I have found an improved conductive molding composition having a high thermal stability and which is readily processable, such as by compression molding, to produce high density information discs of improved quality and which have improved surface characteristics resulting in excellent playback quality. This molding composition comprises a polyvinylchloride-based resin containing sufficient finely divided conductive carbon black particles to obtain a desired conductivity (a bulk resistivity of below about 500 ohm-cm at 900 mHz), from about 1 to about 5 percent by weight of the total composition of a stabilizer, from about 0.5 to about 3 percent by weight of a lubricant, from about 1 to about 5 percent by weight of a plasticizer and from about 0.1 to about 1 percent by weight of an organo-silicone compound having polar groups.

BRIEF DESCRIPTION OF THE DRAWING

The single FIGURE of the drawing is a graph of ion concentration as a function of depth as determined by SIMS for a disc which has been compression molded from the improved conductive molding composition of this invention.

DETAILED DESCRIPTION OF THE INVENTION

Because of the uniqueness and very small dimension of the information on high density information discs, a composition suitable for molding such discs must have a uniform dispersion of conductive particles and the other additives in the resin so that the molded article will have a uniform surface free of defects, minimum shrinkage and warp characteristics and a high heat distortion temperature. The composition must be readily processable to form a very small relief pattern over the surface of a 12 inch disc; and sufficient additives must be added to overcome the stiffness and brittleness imparted by the large quantity of conductive particles present. However, if too large a quantity of total additives are present, the additives bleed to the surface, causing non-uniformity and staining, which adversely affect the disc quality and may even render the disc unplayable by filling up the tiny grooves or information tracks monitored by the playback stylus.

According to the present invention, the improved molding composition thereof includes from about 65 up to about 85 weight percent of the total composition of a vinyl chloride based resin, from about 12 up to about 19 percent by weight of the total composition of finely divided conductive particles, particularly carbon black, from about 1 up to about 5 percent by weight of the total composition of a stabilizer, from about 0.5 up to about 3 percent by weight of the total composition of a lubricant, from about 1 up to about 5 percent by weight of the total composition of a plasticizer, and from about 0.1 up to about 1 percent by weight of the total composition of an organo-silicone compound having polar groups.

The resin employed in the molding composition of this invention can be a homopolymer or copolymer of vinyl chloride, or a mixture of the two. Suitable polymers include polyvinylchloride homopolymer, a vinyl chloride/propylene copolymer, and a vinyl chloride/vinyl acetate copolymer. A preferred resin for use in this molding composition is a homopolymer of vinyl chloride commercially available from the B. F. Goodrich Company as BFG-346, which has a weight average molecular weight of approximately 84,000, a number average molecular weight of approximately 38,000 and a $T_g$ of approximately 88° C. In order to produce the desired characteristics in the video disc, the resin of the molding composition should have a high heat distortion temperature, preferably 140° F. (60° C.) or higher for the unfilled resin.

Conductive particles suitable for use in the molding composition include highly electrically conductive, finely divided carbon blacks which preferably have a low bulk density to reduce loading requirements. Presently preferred products are commercially available from the Armak Company, as Ketjenblack EC, and from the Cabot Carbon Company as CSX-200, which carbon blacks have an apparent bulk density of about 140-160 grams per liter and an average particle size of about 300 Angstroms. These carbon black particles have a high surface area and high proportion of voids within the particles as measured by dibutylphthalate absorption. This characteristic enables current to flow between the conductive particles in a non-conductive polymer matrix in a highly effective manner. Other carbon blacks or conductive particles may be employed if they meet the electrical requirements. Denser carbon particles will usually require higher loading, e.g., up to about 35-40 percent by weight for an equivalent conductivity, which must be at least 500 ohm-cm at 900 mHz in order for the video signals to be reconsituted on playback with a metal tipped stylus. The particle size of these conductive carbon black particles is not critical, but in general the particle size should be less than 500 Angstroms to prevent the formation of a grainy surface in the plastic matrix. As previously indicated, an amount of from about 12 up to about 19 weight percent of a carbon black, such as Cabot's CSX-200 is preferred.

Antioxidant stabilizers suitable for use in the present conductive molding composition include organo-metallic compounds derived from metals including tin, lead, zinc, barium and cadmium, such as dibutyltin-$\beta$-mercaptopropionate, dibutyltin maleate and the like. Epoxides, phosphites and alkylated phenols such as t-butylcatechol can also be employed. Generally, these stabilizers are employed in a minor amount, i.e., about 1 to about 5 percent by weight of the total molding composition. A preferred stabilizer is T-49 available from M & T Chemicals Inc. under the trademark of Thermolite-49, which is an organotin maleate. The stabilizers act primarily to neutralize volatiles formed as decomposition products of the resin.

A lubricant is also added to the PVC-based resin molding composition of this invention. Suitable lubricants include fatty acids and esters, such as stearic acid, fatty acid esters of alcohols and acids, polyfunctional acid and alcohol esters, soaps including calcium stearate, fatty acid amides such as stearic acid amide, oleamide, ethylene and bis stearamide and the like, and silanes such as dimethyl siloxane. Sufficient lubricant is added to prevent high shear heating during processing and to prevent the composition from sticking to the mold during processing. A preferred lubricant for the molding composition of this invention is an ester of a stearate, such as an alkyl stearate or vinyl stearate, which is employed in an amount of from about 0.5 up to about 3 percent by weight of the total composition.

The improved molding composition of this invention also includes a small amount of a plasticizer. The plasticizer is employed in amounts of from about 1 up to about 5 weight percent of the total composition. A preferable plasticizer is diundecyl phthalate.

In addition to the above-described resin, conductive particles, stabilizer, lubricant and plasticizer, the improved conductive molding composition of this invention further includes a small amount of a silicone, particularly an organo-silicone, and preferably an organo-silicone having polar groups. This organo-silicone is employed in amounts of from about 0.1 up to 1 weight percent of the total molding composition. Preferable organo-silicones containing polar groups include bis(-hydroxyalkyl)disiloxanes, such as 1,3-bis(4-hydroxybutyl)-1,3 didecyldimethyldisiloxane, an organo-functional silane available from Union Carbide Corporation as Y-9602, a polyalkylene oxide modified dimethyl polysiloxane available from Union Carbide Corporation as L-722, and a similar silicone alkylene oxide copolymer available from Union Carbide Corporation as L-7676.

A presently preferred conductive molding composition for use in making high density information discs comprises from 12-19 weight percent of the molding composition of Cabot's CSX-200 conductive carbon black particles, from 1.0-5.0 weight percent of the molding composition of T-49 stabilizers, from 0.5-3.0 weight percent of the molding composition of vinyl stearate lubricant, from 1.0-5.0 weight percent of the molding composition of diundecyl phthalate plasticizer, from 0.1-1.0 weight percent of the molding composition of a bis(hydroxyalkyl)disiloxane, with the remainder of the composition being a polyvinylchloride homopolymer (B. F. Goodrich-346) having a $T_g$ of over about 60° C.

The present molding composition can be prepared by mixing all of the solid ingredients first in a blender, such as a Henschel mixer, until the temperature reaches about 120° F. (about 49° C.) and then adding any liquid ingredients which coat the solid particles. The mixing is continued until the temperature reaches about 160° F. (41° C.). The composition is then collected and charged to a Buss Condux extruder or other suitable apparatus to melt the ingredients under shear. The composition is then extruded through the Buss Condux extruder, operating at 150 rpm with the material temperatures in the four zones of the extruder ranging between 120° and 180° C. The rate of flow of the material through the extruder is controlled to produce a good quality composition with optimum melt mixing. Thereafter, the material is passed through a ⅛" die, pelletized and stored for molding. The molded articles (high density information discs) can be made by compression molding in the conventional manner, e.g., forming a preform, compression molding, using a 30-60 second cycle at about 325°-380° F. (163°-190° C.) and removing the flash.

Video discs, fabricated as above from the improved molding composition of this invention, have surfaces which are not stained, as is the case with many video discs of the prior art. Stained disc surfaces have often been caused by the bleeding of additives to the disc surface which not only cause a staining but often non-uniformities on the disc surface as well. In addition to being non-stained, it has been found that the surfaces of the discs molded from this improved composition are hydrophobic, having little affinity for water, even under atmospheric conditions of high temperature and high relative humidity. Due to the non-stained and hydrophobic character of the surfaces of these discs, it has been found that the discs need no further treatment, such as a cleaning or washing as disclosed in U.S. Pat. No. 4,275,100.

The hydrophobic nature of the surfaces of these discs is attributed to the bleeding to the disc surfaces of the organo-silicone compound having polar groups. This is illustrated by the single FIGURE of the drawing wherein a sample from the inner, non-grooved portion of an as-pressed disc fabricated as set forth above was examined by secondary ion mass spectrometry (SIMS). The FIGURE is a graph of the ion concentration as a function of the depth for $28_{Si+}$ and $30_{Si+}$ of the sample from the as-pressed disc. It is readily apparent from the graph that the largest concentration of silicon ions is at the disc surface, thus indicating bleed-out of the organo-silicone compound to the disc surface, and consequent hydrophobic nature of the disc surface. Due to the hydrophobic nature of the disc surface, it has additionally been found that a lubricant such as that disclosed in U.S. Pat. No. 4,275,101 is sufficient and that doped lubricants, such as disclosed in U.S. Pat. Nos. 4,330,583 and 4,355,062, are not required, even if the disc is to be subjected to atmospheric conditions of high relative humidity and high temperature.

The following specific Examples are included in order to illustrate the invention and the improvements thereof with greater particularity. However it is to be understood that these Examples are not intended to limit the invention in any way.

EXAMPLE I

A molding composition was prepared by dry blending the following ingredients in a Henschel mixer: 78.75 parts of BFG-346 polyvinylchloride homopolymer; 3.0 parts of T-49, an organotin maleate stablizer; 1.0 part of vinyl stearate lubricant; 2.0 parts diundecyl phthalate plasticizer; and 0.25 part of 1,3-bis(4-hydroxybutyl)-1,3 didecyldimethyldisiloxane as the organo-silicone having polar groups, for a period of approximately 10 minutes. Thereafter, 15.0 parts of Cabot Carbon Company CSX-200A carbon particles were added to the Henschel mixer and the total ingredients of the formulation were dry-blended therein for an additional ten minutes, or until the temperature reached about 190° F. (87.8° C.).

The compounded mixture was allowed to cool to room temperature and then fed to a Buss Condux extruder from which the same was melt-extruded in the form of a pelletized molding composition. Thereafter, video discs were compression molded from this composition as set forth above and as disclosed in U.S. Pat. No. 4,228,050.

The as-pressed video discs were lubricated with a heretofore known and used video disc lubricant having the following formula:

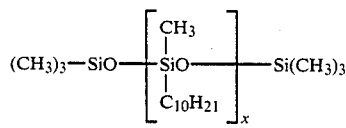

wherein x is an integer of about 2–4, and as disclosed by Wang et al. in U.S. Pat. No. 4,275,101, referred to hereinabove. The lubricant was applied to the surfaces of each disc, without any prior processing or treating of the disc, by spraying with a heptane solution of the lubricant followed by evaporation of the heptane.

For this Example and the Examples that follow, carrier distress, which is a measure of the distortion, loss of signal or dropout of the audio, video and color information coming from the video disc is an important factor. The carrier distress time is measured by adding the amount of time in seconds (but discounting intervals of less than 10 microseconds) during disc playback when the r.f. output of the player arm is less than 150 millivolts peak-to-peak, and the time when the r.f. output gives above 8.6 megahertz or below 3.1 megahertz in frequency, indicating a defect. Such defects are noted by the viewer as dropouts, up to a complete loss of the picture and sound information. The present acceptable level of carrier distress for a video disc is 3 seconds in one hour of playback time.

Another important measure of the quality of the video discs fabricated in this and the following Examples is a factor known as the small skips (less than 8 grooves) event, which is a measure of the quality of the grooves in the disc surface. If the grooves in the disc surface are of such a poor quality that the playback stylus skips a number of them, the disc has a defect which is noted by the viewer as a complete loss of picture and sound information. For the small skips event, the r.f. output of the player arm normally detects 8 daxi-codes per groove (or revolution) of the disc. However, if less than 8 daxi-codes per groove are detected, a defect is indicated in one or more grooves of the disc. The small skips event is determined and reported by adding together the number of times (events) that the playback stylus skips less than 8 grooves (1 to 8) during disc playback. A present desirable level of the small skips event for a video disc is 30 events in 1 hour of playback time.

Carrier distress and the small skips event information for the initial play of the discs obtained and lubricated in accordance with this Example were measured and determined. This information is set forth hereinbelow in the Table.

The discs were then subjected to a hot condensation stress by being placed in a chamber maintained at 95% relative humidity and 100° F. (37.7° C.) for a period of 1 hour and played again. The carrier distress and small skips event data are set forth hereinbelow in the Table.

Also shown in the Table is the percent of the discs which passed the 3 seconds in 60 minutes of playback time criteria referred to hereinabove, as well as the percent of the discs which passed the less than 30 events in 1 hour of playback time criteria referred to above.

EXAMPLE II

In this Example, a molding composition was prepared and video discs were compression molded therefrom as set forth in Example I above with the exception that the organo-silicone compound having polar groups employed was Union Carbide Corporation's L-7676 (0.25 part). The pressed discs were lubricated and treated as in Example I. Thereafter, carrier distress and small skips event information for the initial play and the first play following stress testing were measured and determined. These data are set forth hereinbelow in the Table.

EXAMPLE III

In this Example, a molding composition was prepared and video discs were fabricated therefrom as in Example II above, with the exception that the lubricant used was Loxiol G-30 (1.0 part), a monofatty acid ester of varying molecular weight alcohols and acids of Henkel International GmbH. The video discs fabricated from this molding composition were lubricated and treated as in the preceeding Examples. Thereafter, carrier distress and small skips event information for the initial play as well as the first play following the stress testing of the video discs were measured and determined. These data are set forth hereinbelow in the Table.

EXAMPLE IV

A molding composition was prepared as in Example III above with the exception that the organo-silicone compound having polar groups used was Union Carbide Corporation's Y-9602 (an organofunctional silane). Video discs were fabricated from this molding composition and were lubricated and treated as in the previous Examples. Carrier distress and small skips event information for the initial play, as well as the first play following stress testing for these video discs, were measured and determined. These data are set forth hereinbelow in the Table.

EXAMPLE V

In this Example, a molding composition was prepared and video discs were compression molded therefrom as set forth in Example I above, with the exception that the organo-silicone compound having polar groups employed was Union Carbide Corporation's L-722, which is a polyalkylene oxide modified dimethylpolysiloxane and which was used in the amount of 0.25 part. The video discs molded from this composition were lubricated and treated as in the above Examples. Carrier distress and small skips event information for the initial play, as well as the first play following stress testing for these so-lubricated and treated video discs were measured and determined. These data are set forth hereinbelow in the Table.

EXAMPLE VI

A molding composition was prepared and discs were fabricated therefrom as set forth above in Example V with the single exception that the organo-silicone compound having polar groups (Union Carbide Corporation's L-722) was employed in an amount of 0.5 part, with the amount of the resin employed being proportionately less than that used in Example V. The fabricated discs were lubricated and treated as in the previous Examples. Carrier distress and small skips event information for the initial play, as well as the first play following stress testing for these discs were measured and determined. These data are set forth hereinbelow in the Table.

Control A

A molding composition was prepared using the following ingredients: 77.5 parts of BFG-346 polyvinylchloride homopolymer; 15.0 parts of Cabot Carbon Company's CSX-200A carbon particles; 2.0 parts of T35, a dibutlytin-β-mercaptopropionate stabilizer; 1.0 part of Mark 275, a liquid dibutlytin maleate stabilizer; 0.75 part of Acryloid K-175, a commercially available processing aid of Rohm and Haas Company; 0.5 part of Loxiol G-30 lubricant, a monofatty acid ester of varying molecular weight alcohols and acids; 0.25 part of Loxiol G-70, a polyfunctional complex ester of saturated fatty acids; 1.0 part of calcium stearate lubricant; and 2.0 parts of diundecyl phthalate plasticizer. This molding composition is similar to that disclosed by Martin et al. in U.S. Pat. No. 4,228,050 and was prepared as disclosed by Martin et al. and set forth hereinabove. Video discs were compression molded from this composition as set forth above and as disclosed by Martin et al. The thus obtained video discs were lubricated and treated as in the previous Examples. Carrier distress and small skips event information for the initial play, as well as the first play following stress testing of these video discs, were measured and determined. These data are set forth hereinbelow in the Table.

Control B

Video discs were fabricated from the molding composition of Control A above. The as-pressed discs were then further treated and processed by the previously known and commercially used disc treating process as disclosed in U.S. Pat. No. 4,275,100 to Datta, which includes a washing, rinsing and drying treatment. Following this treatment, the discs were then lubricated with the previously known and commercially used doped lubricant as disclosed in U.S. Pat. No. 4,355,062 to Wang et al. Following disc treatment and lubrication, carrier distress and small skips event information for the initial play, as well as the first play following stress testing for these discs, were measured and determined. These data are set forth hereinbelow in the Table.

TABLE

| | Carrier Distress (sec. per 60 min. Playback Time) | | | | | |
|---|---|---|---|---|---|---|
| | Initial Play | | | 1st Play After Stress | | |
| Example | Median | Range | % Pass | Median | Range | % Pass |
| I | 0.04 | 0.02–0.1 | 100 | 0.89 | 0.05–2.5 | 100 |
| II | 0.6 | 0.2–5.0 | 92 | 0.8 | 0.1–3.5 | 92 |
| III | 0.18 | 0.09–3.5 | 92 | 0.8 | 0.1–5.3 | 92 |
| IV | 0.31 | 0.17–28.8 | 91 | 1.5 | 0.32–28.0 | 82 |
| V | 0.2 | 0.1–2.0 | 100 | 0.5 | 0.1–6.0 | 92 |
| VI | 0.4 | 0.25–12.0 | 83 | 0.8 | 0.3–7.0 | 83 |
| Control A | 0.03 | 0.01–0.19 | 100 | 178.0 | 35.0–588.0 | 0 |
| Control B | 0.1 | 0.09–0.22 | 100 | 0.35 | 0.17–3.8 | 83 |

| | Small Skips Event (events per 60 min. Playback Time) | | | | | |
|---|---|---|---|---|---|---|
| | Initial Play | | | 1st Play After Stress | | |
| Example | Median | Range | % Pass | Median | Range | % Pass |
| I | 6 | 0–41 | 75 | 19 | 2–120 | 70 |
| II | 10 | 2–134 | 75 | 12 | 0–132 | 75 |
| III | 6 | 2–92 | 75 | 6 | 0–162 | 80 |
| IV | 4 | 2–72 | 85 | 6 | 0–120 | 90 |
| V | 7 | 0–110 | 85 | 9 | 0–80 | 85 |
| VI | 5 | 0–95 | 90 | 8 | 0–73 | 80 |
| Control A | 7 | 0–145 | 83 | 32 | 3–168 | 50 |
| Control B | 7 | 0–54 | 75 | 18 | 0–110 | 66 |

From a review of the above Examples and Table, it can be readily seen that this invention provides not only a savings in materials (fewer number of components in the molding composition and no need to use a dopant in the lubricant), but also a savings in the disc processing (no need for treatment or processing of as-pressed discs, such as washing or cleaning, rinsing, and drying) as well, over prior art compositions and processing.

What is claimed is:

1. A conductive molding composition comprising a polyvinylchloride-based resin, a sufficient amount of finely divided conductive carbon black particles such that the composition has a bulk resistivity below about 500 ohm-cm at 900 mHz, from about 0.5 to about 3 percent by weight of a lubricant, from about 1 to about 5 percent by weight of a plasticizer, from about 1 to about 5 percent by weight of a stabilizer, and from about 0.1 to about 1 percent by weight of an organo-silicone compound having polar groups.

2. A conductive molding composition in accordance with claim 1 wherein said finely divided conductive carbon black particles are present in an amount of from about 12 up to about 19 percent by weight of the molding composition.

3. A conductive molding composition in accordance with claim 1 wherein said polyvinylchloride-based resin is a homopolymer of vinyl chloride.

4. A conductive molding composition in accordance with claim 1 wherein said polyvinylchloride-based resin is present in an amount of from about 65 up to about 85 percent by weight of the molding composition.

5. A conductive molding composition in accordance with claim 2 wherein said conductive carbon black particles have an apparent bulk density of about 140–160 grams per liter and an average particle size of less than 500 Angstroms.

6. A conductive molding composition in accordance with claim 1 wherein said lubricant is a stearate ester.

7. A conductive molding composition in accordance with claim 1 wherein said plasticizer is diundecyl phthalate.

8. A conductive molding composition in accordance with claim 1 wherein said stabilizer is an organo-tin maleate.

9. A conductive molding composition in accordance with claim 1 wherein said organo-silione compound having polar groups is a bis(hydroxyalkyl)disiloxane.

10. A molding composition in accordance with claim 9 wherein said bis(hydroxyalkyl)disiloxane is 1,3-bis(4-hydroxybutyl)1,3 didecyldimethyldisiloxane.

11. In a high density information record adapted for use with a playback stylus to effect recovery of signals occupying a bandwidth of at least several megahertz when relative motion at a desired rate is established between said record and said stylus, said record comprising a disc of molded plastic material containing a sufficient amount of finely divided conductive particles such that the material has a bulk resistivity below about 500 ohm-cm at 900 mHz and having an information track in a surface thereof constituted by a surface relief pattern of such dimension to accommodate recovery of said signals upon establishment of said motion at said rate, the improvement comprising employing as said plastic material a conductive molding composition comprising a polyvinylchloride-based resin, finely divided conductive carbon black particles, from about 0.5 to about 3 percent by weight of a lubricant, from about 1 to about 5 percent by weight of a plasticizer, from about 1 to about 5 percent by weight of a stabilizer, and from about 0.1 to about 1 percent by weight of an organo-silicone compound having polar groups.

12. A high density information record in accordance with claim 11 wherein said conductive carbon black particles are present in an amount of from about 12 up to about 19 percent by weight of said molding composition.

13. A high density information record in accordance with claim 11 wherein said polyvinylchloride-based resin is a homopolymer of vinyl chloride.

14. A high density information record in accordance with claim 11 wherein said polyvinylchloride-based resin is present in an amount of from about 65 up to about 85 percent by weight of said molding composition.

15. A high density information record in accordance with claim 12 wherein said conductive carbon black particles have an apparent bulk density of about 140 to about 160 grams per liter and an average particle size of less than 500 Angstroms.

16. A high density information record in accordance with claim 11 wherein said lubricant is a stearate ester.

17. A high density information record in accordance with claim 11 wherein said plasticizer is diundecyl phthalate.

18. A high density information record in accordance with claim 11 wherein said stabilizer is an organo-tin maleate.

19. A high density information record in accordance with claim 11 wherein said organo-silicone compound having polar groups is 1,3-bis(4-hydroxybutyl)-1,3 didecyldimethyldisiloxane.

20. A high density information record in accordance with claim 11 wherein a layer of a methylalkylsiloxane lubricant of the formula:

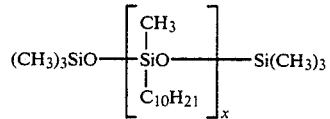

wherein x is an integer of about 2–4, is disposed over the record.

21. A conductive molding composition in accordance with claim 1 wherein said organo-silicone compound having polar groups is an organo-silicone compound having hydroxyl end groups.

22. A high density information record in accordance with claim 11 wherein said organo-silicone compound having polar groups is an organo-silicone compound having hydroxyl end groups.

* * * * *